No. 706,660. Patented Aug. 12, 1902.
E. HUBER.
FRICTION CLUTCH.
(Application filed Feb. 26, 1902.)
(No Model.) 3 Sheets—Sheet 1.
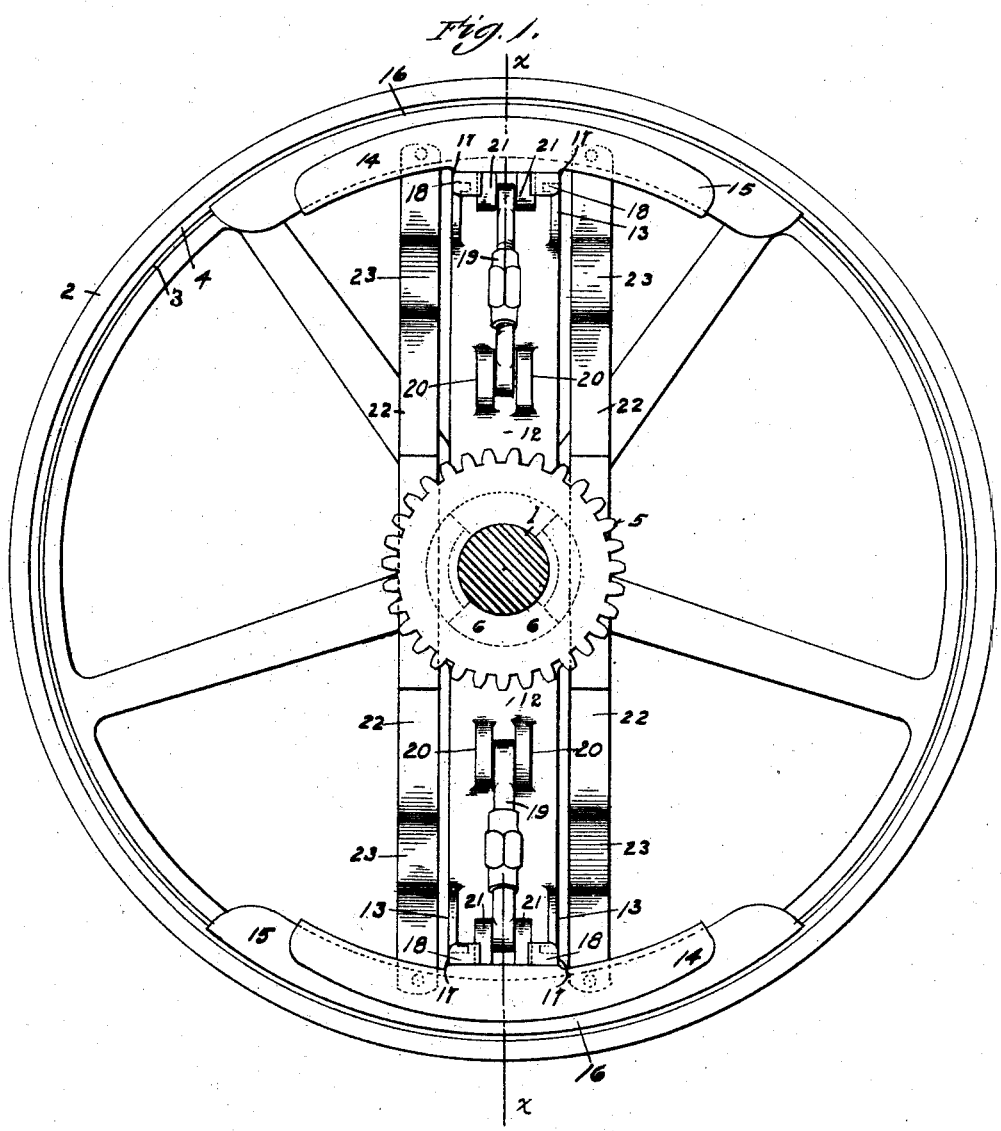

No. 706,660. Patented Aug. 12, 1902.
E. HUBER.
FRICTION CLUTCH.
(Application filed Feb. 26, 1902.)
(No Model.) 3 Sheets—Sheet 2.
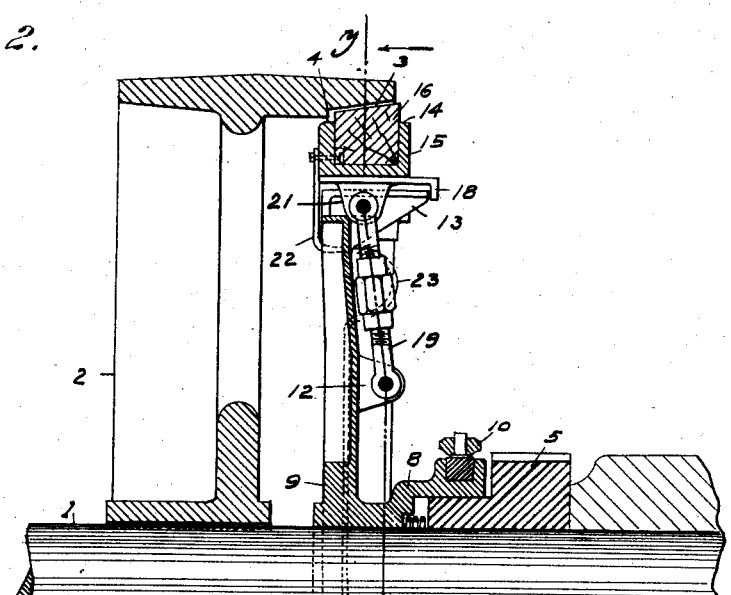
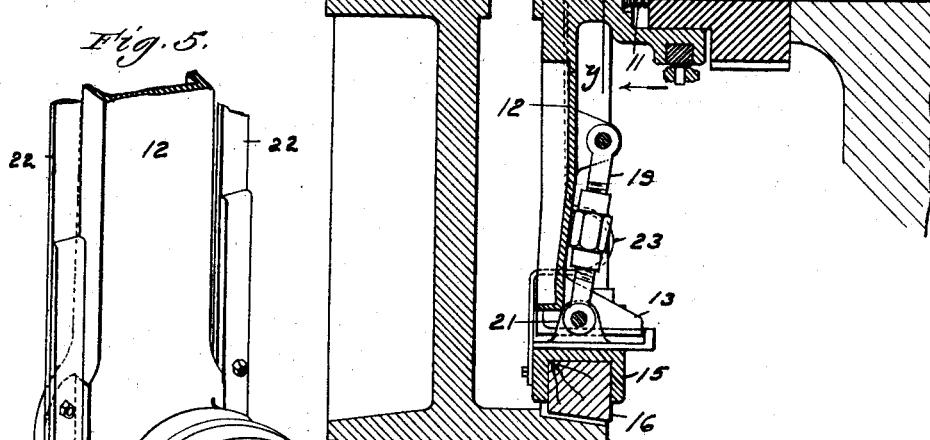
WITNESSES: INVENTOR.
Edward Huber
BY
ATTORNEY.

No. 706,660. Patented Aug. 12, 1902.
E. HUBER.
FRICTION CLUTCH.
(Application filed Feb. 26, 1902.)
(No Model.) 3 Sheets—Sheet 3.

WITNESSES:
J. C. Dawley
Will Laughlin

INVENTOR.
Edward Huber
BY
ATTORNEY.

THE NORRIS PETERS CO., PHOTO-LITHO., WASHINGTON, D. C.

UNITED STATES PATENT OFFICE.

EDWARD HUBER, OF MARION, OHIO.

FRICTION-CLUTCH.

SPECIFICATION forming part of Letters Patent No. 706,660, dated August 12, 1902.

Application filed February 26, 1902. Serial No. 95,778. (No model.)

*To all whom it may concern:*

Be it known that I, EDWARD HUBER, a citizen of the United States, residing at Marion, in the county of Marion and State of Ohio, have invented certain new and useful Improvements in Friction-Clutches, of which the following is a specification, reference being had therein to the accompanying drawings.

This invention relates to friction-clutches, and has for its object to provide a clutch which shall be simple and inexpensive in construction and efficient in operation.

To these ends the invention consists in certain novel features, which I will now proceed to describe and will the nparticularly point out in the claims.

Figure 3:
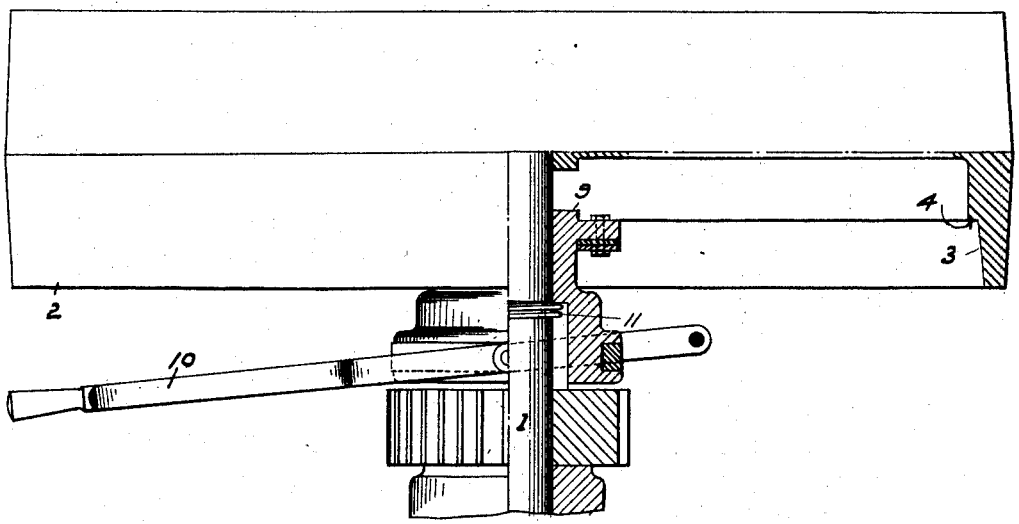
Figure 4:
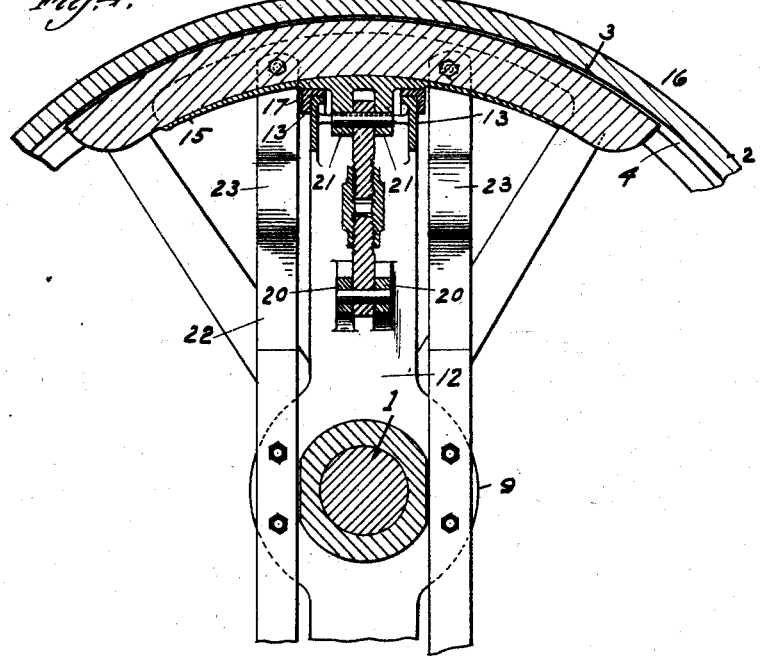

In the accompanying drawings, Figure 1 is an elevation of a clutch embodying my invention in one form. Fig. 2 is a vertical sectional view of the same, taken on the line $xx$ of Fig. 1. Fig. 3 is a plan view, partly in horizontal section. Fig. 4 is a detail sectional view taken on the line $y$ $y$ of Fig. 2 and looking in the direction of the arrows. Fig. 5 is a detail perspective view of the central portion of the spider or hub and its associated parts, and Fig. 6 is a detail view of the clutch-pinion.

In the said drawings, 1 indicates a shaft on which is secured a friction wheel or pulley 2, having on the inner face of its rim a friction-surface 3, terminating in a radial shoulder 4.

5 indicates a pinion loosely mounted on the shaft and having projecting from one of its faces clutch projections 6, which engage corresponding notches or recesses 7 in the collar 8, which is formed in one piece with the hub or spider 9. The hub and collar have a shifting lever 10, connected to them in the usual manner, and I prefer to interpose between the hub and the pinion 5, so that it is inclosed by the collar 8, a coiled spring 11. The hub or spider 9 is provided with rigid radial arms 12, terminating in guideways 13, which extend transversely of the arms and parallel with the shaft 1.

14 indicates the shoe as a whole, composed of the metal body 15 and wooden shoe proper or friction-surface, 16, which is shaped to fit the friction-surface 3 of the friction-wheel 2. The shoe 14 is provided with guideways 17, which fit upon the guideways 13 in such a way as to prevent lateral displacement of the shoes relatively to the arms 12, while at the same time permitting the shoe to move radially in and out and in a direction parallel with the shaft. The guideways 17 are also preferably provided with terminal stops 18, which may abut against the ends of the ways 13 to limit the motion of the shoes relatively to the arms in one direction. Each shoe is connected with the corresponding radial arm by means of a toggle-arm 19, pivoted between lugs 20 on the radial arm and between similar lugs 21 on the shoe. The toggle-arms extend in opposite directions from the hub 9, there being one for each radial arm 12, and each toggle-arm is preferably constructed of two parts or sections having their adjacent ends oppositely threaded and connected by a right and left threaded sleeve, by means of which their length may be adjusted as desired.

So far as the connection between the shoes and the radial arms of the spider have been described the shoes are free to move in and out relatively to the shaft and radial arms and also transversely relatively to the radial arms in a direction longitudinal of the shaft. These motions are, however, controlled and regulated by springs connecting the arms and shoes, and for this purpose I prefer to employ the particular form of springs shown. From the hub there extends in each direction parallel with each radial arm and on each side thereof a flat spring 22, secured to the hub at its inner end and to the shoe at its outer end and having between its ends a U-shaped bend or loop 23. Preferably the two springs on the same side of the hub are made in a single piece, as shown. Other forms of spring connections may, however, be employed. It will be observed that when the parts are in the position shown in the drawings the shoes stand in a position in which they are disengaged from the friction-wheel, being held in this position by the springs 22. Upon moving the lever 10, so as to move the hub 9 and arms 12 toward the friction-wheel, the springs 22 will partake of the movement of the hub and arms 12 toward the friction-wheel, and said springs will carry the shoes toward the friction-wheel until the inner edges of the shoes strike against the shoulder 4 of the friction-wheel. As the hub and radial arms continue their motion toward the friction-wheel the toggle-arms will force the shoes radially outward and cause them to firmly engage the friction-surface 3 of the friction-wheel, the springs 22 permitting this outward motion of the shoes owing to their structure and the presence of the U-shaped bends 23 therein. The friction-wheel is thus operatively connected with the pinion 5 through the driving connection between the collar 8 and pinion, which is constant throughout the range of movement of the clutch. In disengaging the clutch the hub and radial arms are moved in the opposite direction, whereupon the toggle-arms first disengage the shoes from the friction-wheel, the springs aiding in this disengagement by their contraction and subsequently serving to withdraw the shoes laterally from engagement with the friction-wheel in an obvious manner.

It will be seen that the construction is simple and inexpensive and that the clutch is efficient and certain in operation.

I do not wish to be understood as limiting myself to the precise details of construction hereinbefore described, as it is obvious that various modifications in the details thereof may be made without departing from the principle of my invention as defined in the claims. For instance, as already stated, other forms of spring other than the particular form shown may be employed, and the hub or spider 9 may be connected with the pinion by means other than those described and illustrated.

Having thus fully described my invention, what I claim as new, and desire to secure by Letters Patent, is—

1. In a friction-clutch, the combination, with a shaft, of a friction-wheel having an internal annular friction-surface, and means for limiting the motion of the shoes along the shaft toward the friction-wheel, a spider movable longitudinally of the shaft and having radial arms, means for moving said spider longitudinally of the shaft, shoes adapted to engage the friction-wheel, said shoes and radial arms being capable of independent movement, toggle-arms pivoted to the radial arms and to the shoes, and centripetally-acting springs connecting the radial arms and shoes and serving also to transmit to the shoes the movement of the radial arms longitudinally of the shaft, substantially as described.

2. In a friction-clutch, the combination, with a shaft, of a friction-wheel having an internal annular friction-surface, and means for limiting the motion of the shoes along the shaft toward the friction-wheel, a spider movable longitudinally on the shaft and having radial arms, means for moving said spider longitudinally of the shaft, shoes adapted to engage the friction-wheel, said shoes and radial arms being capable of independent movement, toggle-arms pivoted to the radial arms and to the shoes, and flat springs secured at their ends to the spider and shoes respectively and having intermediate U-shaped bends, substantially as described.

3. In a friction-clutch, the combination, with a shaft, of a friction-wheel having an internal annular friction-surface, and means for limiting the motion of the shoes along the shaft toward said friction-wheel, a spider movable longitudinally of the shaft and having radial arms provided with terminal guiding-ways parallel with the shaft, means for moving said spider longitudinally of the shaft, shoes adapted to engage the friction-wheel and having guiding-ways fitting the guiding-ways of the radial arms, whereby the shoes are movably supported on said radial arms, toggle-arms pivoted to the radial arms and to the shoes, and centripetally-acting springs connecting the radial arms and shoes and serving also to transmit to the shoes the movement of the radial arms longitudinally of the shaft, substantially as described.

4. In a friction-clutch, the combination, with a shaft, of a friction-wheel secured thereon and having an internal annular friction-surface, and means for limiting the motion of the shoes along the shaft toward said friction-wheel, a spider loosely mounted on the shaft, provided with a clutch-collar and having radial arms, means for moving said spider longitudinally of the shaft, shoes adapted to engage the friction-wheel, said shoes and radial arms being capable of independent movement, toggle-arms pivoted to the radial arms and to the shoes, centripetally-acting springs connecting the radial arms and shoes and serving also to transmit to the shoes the movement of the radial arms longitudinally of the shaft, a pinion loosely mounted on the shaft and provided with a clutch member to engage the clutch-collar of the spider, and a spring interposed between the pinion and spider, substantially as described.

In testimony whereof I affix my signature in presence of two witnesses.

EDWARD HUBER.

Witnesses:
F. A. SCHROETER,
J. W. KNAPP.